(12) United States Patent
Pham

(10) Patent No.: US 7,417,566 B2
(45) Date of Patent: Aug. 26, 2008

(54) SEQUENTIAL TWO-KEY SYSTEM TO INPUT KEYBOARD CHARACTERS AND MANY ALPHABETS ON SMALL KEYPADS

(76) Inventor: Don Pham, 1851 Lake Shore Cir., Longwood, FL (US) 32750

( * ) Notice: Subject to any disclaimer, the term of this patent is extended or adjusted under 35 U.S.C. 154(b) by 37 days.

(21) Appl. No.: 11/383,605

(22) Filed: May 16, 2006

(65) Prior Publication Data

US 2006/0267804 A1 Nov. 30, 2006

Related U.S. Application Data

(60) Provisional application No. 60/685,297, filed on May 31, 2005.

(51) Int. Cl.
*H03K 17/94* (2006.01)
(52) U.S. Cl. ............... 341/22; 341/26; 341/34; 341/173; 341/176; 345/160; 345/168; 379/90.01
(58) Field of Classification Search ............ 341/22, 341/26, 34, 20, 173, 23, 176; 345/160–168; 379/90.01; 715/763
See application file for complete search history.

(56) References Cited

U.S. PATENT DOCUMENTS

| | | | |
|---|---|---|---|
| 3,967,273 A | 6/1976 | Knowlton | |
| 4,658,417 A | 4/1987 | Hashimoto et al. | |
| 5,117,455 A | 5/1992 | Danish | |
| 5,339,358 A | 8/1994 | Danish et al. | |
| 5,392,338 A | 2/1995 | Danish et al. | |
| 6,016,142 A * | 1/2000 | Chang et al. | 715/763 |
| 6,320,942 B1 * | 11/2001 | Chang | 379/93.27 |
| 6,765,556 B2 | 7/2004 | Kandogan et al. | |
| 6,802,661 B1 | 10/2004 | Lee et al. | |
| 6,847,706 B2 | 1/2005 | Bozorgui-Nesbat | |
| 2005/0099397 A1* | 5/2005 | Ono | 345/172 |

\* cited by examiner

*Primary Examiner*—Jeff Hofsass
*Assistant Examiner*—Sisay Yacob
(74) *Attorney, Agent, or Firm*—Christine Q. McLeod; Beusse Wolter Sanks Mora & Maire

(57) ABSTRACT

This invention discloses a sequential two-key system to input letters of the English alphabet and of many world languages, numbers, punctuation marks, page-control characters, line-control characters, cursor-control characters and many other symbols on keypads with few buttons. Character repeating, shifting and control access are feasible. Brief and easy to understand notations are displayed on the keypads. The system is easy to learn and the keypads may be used on portable devices such as PDA, hand-held computers, hand-held text-messaging devices and telephones.

32 Claims, 17 Drawing Sheets

| Character | First button | Second button |
|---|---|---|
| A | 501 | 501 |
| B | 501 | 502 |
| C | 501 | 503 |
| D | 501 | 504 |
| E | 501 | 505 |
| F | 501 | 506 |
| G | 502 | 501 |
| H | 502 | 502 |
| I | 502 | 503 |
| J | 502 | 504 |
| K | 502 | 505 |
| L | 502 | 506 |
| M | 503 | 501 |
| N | 503 | 502 |
| O | 503 | 503 |
| P | 503 | 504 |
| Q | 503 | 505 |
| R | 503 | 506 |
| S | 504 | 501 |
| T | 504 | 502 |
| U | 504 | 503 |
| V | 504 | 504 |
| W | 504 | 505 |
| X | 504 | 506 |
| Y | 505 | 501 |
| Z | 505 | 502 |

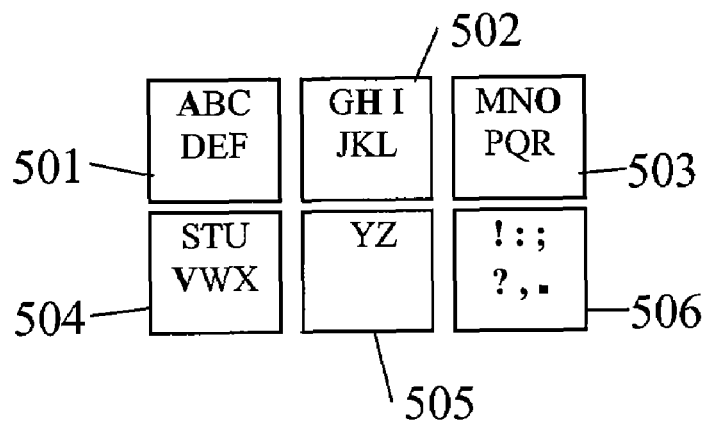
Figure 3
| Punctuation | First button | Second button |
|---|---|---|
| Exclamation Mark | 506 | 501 |
| Colon | 506 | 502 |
| Semi-Colon | 506 | 503 |
| Question Mark | 506 | 504 |
| Coma | 506 | 505 |
| Period | 506 | 506 |
Figure 4
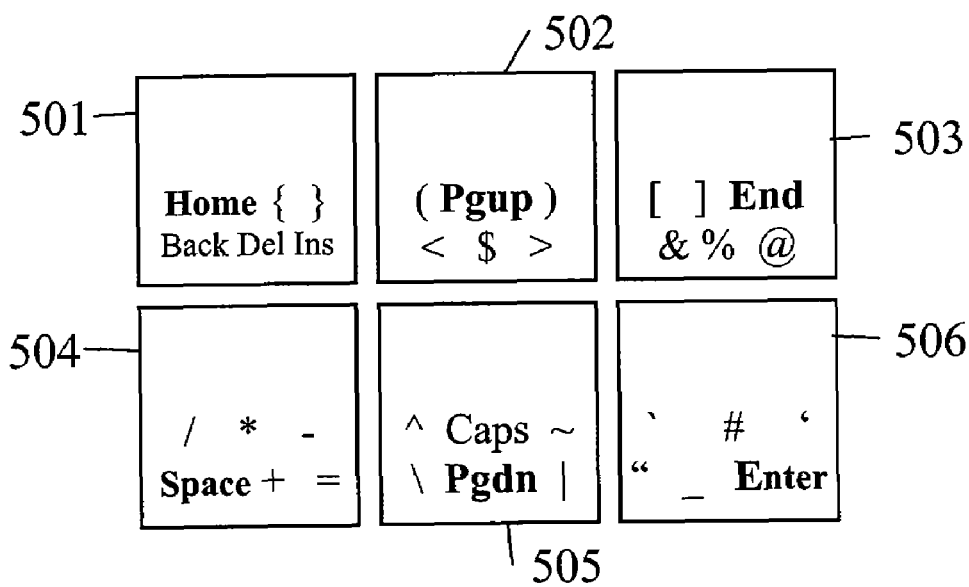
Figure 5

| Character | First button | Second button |
|---|---|---|
| Home | 501 | 501 |
| { | 501 | 502 |
| } | 501 | 503 |
| Backspace | 501 | 504 |
| Delete | 501 | 505 |
| Insert | 501 | 506 |
| ( | 502 | 501 |
| Page Up | 502 | 502 |
| ) | 502 | 503 |
| < | 502 | 504 |
| $ | 502 | 505 |
| > | 502 | 506 |
| [ | 503 | 501 |
| ] | 503 | 502 |
| End | 503 | 503 |
| & | 503 | 504 |
| % | 503 | 505 |
| @ | 503 | 506 |
| / | 504 | 501 |
| * | 504 | 502 |
| Minus | 504 | 503 |
| Space | 504 | 504 |
| + | 504 | 505 |
| = | 504 | 506 |
| ^ | 505 | 501 |
| Caps Lock | 505 | 502 |
| ~ | 505 | 503 |
| \ | 505 | 504 |
| Page Down | 505 | 505 |
| \| | 505 | 506 |
| Grave accent | 506 | 501 |
| # | 506 | 502 |
| Single Quote | 506 | 503 |
| Double Quote | 506 | 504 |
| Low line | 506 | 505 |
| Enter | 506 | 506 |

Figure 6

| Character | First button | Second button |
|---|---|---|
| Leftwards Arrow | 501 | 501 |
| { | 501 | 502 |
| } | 501 | 503 |
| Backspace | 501 | 504 |
| Delete | 501 | 505 |
| Insert | 501 | 506 |
| ( | 502 | 501 |
| Upwards Arrow | 502 | 502 |
| ) | 502 | 503 |
| < | 502 | 504 |
| $ | 502 | 505 |
| > | 502 | 506 |
| [ | 503 | 501 |
| ] | 503 | 502 |
| Rightwards Arrow | 503 | 503 |
| & | 503 | 504 |
| % | 503 | 505 |
| @ | 503 | 506 |
| / | 504 | 501 |
| * | 504 | 502 |
| Minus | 504 | 503 |
| Space | 504 | 504 |
| + | 504 | 505 |
| = | 504 | 506 |
| ^ | 505 | 501 |
| Caps Lock | 505 | 502 |
| ~ | 505 | 503 |
| \ | 505 | 504 |
| Downwards Arrow | 505 | 505 |
| \| | 505 | 506 |
| Grave Accent | 506 | 501 |
| # | 506 | 502 |
| Single Quote | 506 | 503 |
| Double Quote | 506 | 504 |
| Low Line | 506 | 505 |
| Enter | 506 | 506 |

Figure 8

| Character | First button | Second button |
|---|---|---|
| A | 501 | 501 |
| B | 501 | 502 |
| C | 501 | 503 |
| D | 501 | 504 |
| E | 501 | 505 |
| F | 501 | 506 |
| G | 502 | 501 |
| H | 502 | 502 |
| I | 502 | 503 |
| J | 502 | 504 |
| K | 502 | 505 |
| L | 502 | 506 |
| M | 503 | 501 |
| N | 503 | 502 |
| O | 503 | 503 |
| P | 503 | 504 |
| Q | 503 | 505 |
| R | 503 | 506 |
| S | 504 | 501 |
| T | 504 | 502 |
| U | 504 | 503 |
| V | 504 | 504 |
| W | 504 | 505 |
| X | 504 | 506 |
| Y | 505 | 501 |
| Z | 505 | 502 |
| Tab | 505 | 503 |
| Escape | 505 | 504 |
| Help | 505 | 505 |
| Alt | 505 | 506 |
| ! | 506 | 501 |
| Colon | 506 | 502 |
| Semi-colon | 506 | 503 |
| ? | 506 | 504 |
| Coma | 506 | 505 |
| Period | 506 | 506 |

Figure 10

| Character | First Button | Second Button |
|---|---|---|
| Leftwards Arrow | 507 | 507 |
| { | 507 | 508 |
| } | 507 | 509 |
| Backspace | 507 | 510 |
| Delete | 507 | 511 |
| Insert | 507 | 512 |
| ( | 508 | 507 |
| Upwards Arrow | 508 | 508 |
| ) | 508 | 509 |
| < | 508 | 510 |
| $ | 508 | 511 |
| > | 508 | 512 |
| [ | 509 | 507 |
| ] | 509 | 508 |
| Rightwards Arrow | 509 | 509 |
| & | 509 | 510 |
| % | 509 | 511 |
| @ | 509 | 512 |
| / | 510 | 507 |
| * | 510 | 508 |
| Minus | 510 | 509 |
| Space | 510 | 510 |
| + | 510 | 511 |
| = | 510 | 512 |
| ^ | 511 | 507 |
| Caps Lock | 511 | 508 |
| ~ | 511 | 509 |
| \ | 511 | 510 |
| Downwards Arrow | 511 | 511 |
| \| | 511 | 512 |
| Grave accent | 512 | 507 |
| # | 512 | 508 |
| Single Quote | 512 | 509 |
| Double Quote | 512 | 510 |
| Low line | 512 | 511 |
| Enter | 512 | 512 |

Figure 11

| Character | First Button | Second Button |
|---|---|---|
| Home | 507 | 507 |
| { | 507 | 508 |
| } | 507 | 509 |
| Backspace | 507 | 510 |
| Delete | 507 | 511 |
| Insert | 507 | 512 |
| ( | 508 | 507 |
| Page Up | 508 | 508 |
| ) | 508 | 509 |
| < | 508 | 510 |
| $ | 508 | 511 |
| > | 508 | 512 |
| [ | 509 | 507 |
| ] | 509 | 508 |
| End | 509 | 509 |
| & | 509 | 510 |
| % | 509 | 511 |
| @ | 509 | 512 |
| / | 510 | 507 |
| * | 510 | 508 |
| Minus | 510 | 509 |
| Space | 510 | 510 |
| + | 510 | 511 |
| = | 510 | 512 |
| ^ | 511 | 507 |
| Caps Lock | 511 | 508 |
| ~ | 511 | 509 |
| \ | 511 | 510 |
| Page Down | 511 | 511 |
| \| | 511 | 512 |
| Grave Accent | 512 | 507 |
| # | 512 | 508 |
| Single Quote | 512 | 509 |
| Double Quote | 512 | 510 |
| Low Line | 512 | 511 |
| Enter | 512 | 512 |

Figure 13

| Character | First button | Second button |
|---|---|---|
| A | 501 | 501 |
| B | 501 | 502 |
| C | 501 | 503 |
| D | 501 | 504 |
| E | 501 | 505 |
| F | 501 | 506 |
| G | 502 | 501 |
| H | 502 | 502 |
| I | 502 | 503 |
| J | 502 | 504 |
| K | 502 | 505 |
| L | 502 | 506 |
| M | 503 | 501 |
| N | 503 | 502 |
| O | 503 | 503 |
| P | 503 | 504 |
| Q | 503 | 505 |
| R | 503 | 506 |
| S | 504 | 501 |
| T | 504 | 502 |
| U | 504 | 503 |
| V | 504 | 504 |
| W | 504 | 505 |
| X | 504 | 506 |
| Y | 505 | 501 |
| Z | 505 | 502 |
| Exclamation Mark | 506 | 501 |
| Colon | 506 | 502 |
| Semi-colon | 506 | 503 |
| Question Mark | 506 | 504 |
| Coma | 506 | 505 |
| Period | 506 | 506 |

Figure 15

| Character | First button | Second button |
|-----------|--------------|---------------|
| 1 | 507 | 501 |
| 2 | 507 | 502 |
| 3 | 507 | 503 |
| 4 | 507 | 504 |
| 5 | 507 | 505 |
| 6 | 507 | 506 |
| 7 | 508 | 501 |
| 8 | 508 | 502 |
| 9 | 508 | 503 |
| 0 | 508 | 504 |
| / | 509 | 501 |
| * | 509 | 502 |
| Minus | 509 | 503 |
| + | 509 | 504 |
| = | 509 | 505 |

| Character | First button | Second button |
|---|---|---|
| A | 501 | 501 |
| B | 501 | 502 |
| C | 501 | 503 |
| D | 501 | 504 |
| E | 501 | 505 |
| F | 501 | 506 |
| G | 502 | 501 |
| H | 502 | 502 |
| I | 502 | 503 |
| J | 502 | 504 |
| K | 502 | 505 |
| L | 502 | 506 |
| M | 503 | 501 |
| N | 503 | 502 |
| O | 503 | 503 |
| P | 503 | 504 |
| Q | 503 | 505 |
| R | 503 | 506 |
| S | 504 | 501 |
| T | 504 | 502 |
| U | 504 | 503 |
| V | 504 | 504 |
| W | 504 | 505 |
| X | 504 | 506 |
| Y | 505 | 501 |
| Z | 505 | 502 |
| 1 | 505 | 503 |
| 2 | 505 | 504 |
| 3 | 505 | 505 |
| 4 | 505 | 506 |
| 5 | 506 | 501 |
| 6 | 506 | 502 |
| 7 | 506 | 503 |
| 8 | 506 | 504 |
| 9 | 506 | 505 |
| 0 | 506 | 506 |

Figure 18

| Hebrew letter | First button | Second button |
|---|---|---|
| Sah-mekh (ס) | 501 | 501 |
| Nun (נ) | 501 | 502 |
| Mem (מ) | 501 | 503 |
| Tsah-dee (צ) | 501 | 504 |
| Feh (פ) | 501 | 505 |
| Ah-yin (ע) | 501 | 506 |
| Teht (ט) | 502 | 501 |
| Heht (ח) | 502 | 502 |
| Zah-yin (ז) | 502 | 503 |
| Lah-med (ל) | 502 | 504 |
| Khahf (כ) | 502 | 505 |
| Yohd (י) | 502 | 506 |
| Gee-mel (ג) | 503 | 501 |
| Veht (ב) | 503 | 502 |
| Ah-leph (א) | 503 | 503 |
| Vahv (ו) | 503 | 504 |
| Heh (ה) | 503 | 505 |
| Dah-let (ד) | 503 | 506 |
| Sheen (ש) | 505 | 501 |
| Rehsh (ר) | 505 | 502 |
| Kof (ק) | 505 | 503 |
| Tav (ת) | 506 | 501 |

SEQUENTIAL TWO-KEY SYSTEM TO INPUT KEYBOARD CHARACTERS AND MANY ALPHABETS ON SMALL KEYPADS

RELATED APPLICATIONS

This application claims the benefit of U.S. Provisional Application No. 60/685,297, filed on May 31, 2005, incorporated herein by reference in its entirety.

FIELD OF THE INVENTION

The invention relates to methods and apparatus to input characters when the number of buttons on a keypad is less than the number of characters.

BACKGROUND OF THE INVENTION

One limiting size factor of hand-held digital devices such as a PDA (personal digital assistant) is the number of buttons on their keyboard, making it difficult for text inputting. Telephones have the same text-inputting problem via their twelve buttons. There has also been a gradual integration of PDA and phone, which underlines the need for a good method of text inputting with few buttons.

U.S. Pat. Nos. 5,392,338 and 4,658,417 are directed to inputting alphabet via the phone keypad, in which pushing a button one or more times during some period enters a character. The method is simple, easy to learn but is slow and limited in the number of characters.

The most promising system to by-pass the disadvantages of the above multi-pressed method is the two-key system, in which each character is entered via two buttons, pressed simultaneously or sequentially. Typewriter and computer keyboards have always used the system. Capitalizing, for example, is by simultaneously pressing a shift button and another button. Most computer applications support control actions on simultaneous pressing a control button and another button and many also allow menu selection by sequentially pressing an alt button and then typing another button. The two-key system is also commonly used to input non-English alphabet letters.

Knowlton, in U.S. Pat. No. 3,967,273, describes the layout of the standard QWERTY keyboard on the telephone keyboard and sets the rules for the two-key system that others build on with variations. First, encoding of each character is with two buttons, pressed sequentially. Next, each button is labeled with an array of characters. Finally, the button labeled with the character to encode is the first button and the location of the second button can be inferred from the location of the character relative to other characters on the button.

U.S. Pat. Nos. 5,117,455 and 5,339,358 describe an arrangement of characters between buttons; the sequence of activating the buttons indicates the entry of that letter or symbol.

Kandogan and his associates, in U.S. Pat. No. 6,765,556, use two buttons of the same row to input alphabet on the standard phone keypad.

Lee and associates, in patent number U.S. Pat. No. 6,802,661, describe a matrix of tables. The first button selects a table and the second button selects an entry in the table.

Bozorgui-Nesbat, in U.S. Pat. No. 6,847,706, describes a system that places the alphabet on a keyboard based on occurrence frequency.

The above methods have not gained popularity probably because either there was no need for it at the time or they involve a steep learning curve. Most have ignored characters frequently used in computing and languages not based on Latin alphabet.

All patents, patent applications, provisional applications, and publications referred to or cited herein, or from which a claim for benefit of priority has been made, are incorporated herein by reference in their entirety to the extent they are not inconsistent with the explicit teachings of this specification.

BRIEF SUMMARY OF THE INVENTION

This invention discloses a sequential two-key system to input letters of the English alphabet and of many world languages, numbers, punctuation marks, page-control characters, line-control characters, cursor-control characters and many other symbols on keypads with few buttons. Character repeating, shifting and control access are feasible. Brief and easy to understand notations are displayed on the keypads. The system is easy to learn and the keypads may be used on portable devices such as PDA, hand-held computers, hand-held text-messaging devices and telephones.

For ease of reference, as used throughout the specification and claims, the representation <CHAR> means a character. For example <A> means the letter A. Moreover, the representation (R, C) means the "Row" and "Column" in an array. Moreover, <CHAR>(R', C'), represents a character array and key(R, C) represents a keypad array, following standard array notation as known in the art. For the invention, each key in the keypad can have a character array thereon and/or mapped thereto.

In an embodiment, the invention includes a device for receiving input characters from a user wherein input characters <CHAR> comprise alphanumeric characters and keyboard commands, comprising a keypad comprising a plurality of keys arranged in rows R and columns C forming a keypad array; a character set arranged in rows R' and columns C' displayed in association with each of the plurality of keys forming a character array, wherein each element in the character array, <CHAR>(R', C'), is mapped to each element in the keypad array, key(R, C), with matching location coordinates for processing selection of a character; a processor for receiving a first selection of one of the plurality of keys on the keypad to designate a character set followed by a second selection of one of the plurality of keys on the keypad to designate a character within the character set by its corresponding location coordinate as mapped on the keypad array. The keypad array can comprise up to six keys arranged in three columns and two rows and the character array can comprise three columns and two rows providing for a character set of up to six characters on each key.

In a detailed embodiment, the keys and characters are mapped as follows: key (1,1) comprises character set {<A>(1,1), <B>(1,2), <C>(1,3), <D>(2,1), <E>(2,2), <F>(2,3)}; key (1,2) comprises character set {<G>(1,1), <H>(1,2), <I>(1,3), <J>(2,1), <K>(2,2), <L>(2,3)}; key (1,3) comprises character set {<M>(1,1), <N>(1,2), <O>(1,3), <P>(2,1), <Q>(2,2), <R>(2,3)}; key (2,1) comprises character set {<S>(1,1), <T>(1,2), <U>(1,3), <V>(2,1), <W>(2,2), <X>(2,3)}; and key (2,2) comprises character set {<Y>(1,1), <Z>(1,2)}. The keys and characters may be further mapped as follows: key (2,3) comprises character set {<!>(1,1), <:>(1,2), <;>(1,3), <?>(2,1), <,>(2,2), <.>(2,3)}.

In a further embodiment, the keys and characters are mapped as follows: key (1,1) comprises character set {<HOME>(1,1), <{>(1,2), <}>(1,3), <BACK>(2,1), <DELETE>(2,2), <INSERT>(2,3)}; key (1,2) comprises character set {<(>(1,1), <PgUp>(1,2), <)>(1,3), <<>(2,1), <$>(2,2), <>>(2,3)}; key (1,3) comprises character set {<[>(1,1), <]>(1,2), <End>(1,3), <&>(2,1), <%>(2,2), <@>(2,3)}; key (2,1) comprises character set {</>(1,1), <*>(1,2), <->(1,3), <SPACE>(2,1), <+>(2,2), <=>(2,3)}; key (2,2) comprises character set {<^>(1,1), <CAPS>(1,2), <~>(1,3), <\>(2,1), <PgDn>(2,2), <|>(2,3)}; and key (2,3) comprises character set {<>(1,1), <#>(1,2), <'>(1,3), <">(2,1), <_>(2,2), <Enter>(2,3)}.

In a further embodiment, the keys and characters are mapped as follows: key (1,1) comprises character set {<Left Arrow>(1,1), <{>(1,2), <}>(1,3), <BACK>(2,1), <DELETE>(2,2), <INSERT>(2,3)}; key (1,2) comprises character set {<(>(1,1), <Up Arrow>(1,2), <)>(1,3), <<>(2,1), <$>(2,2), <>>(2,3)}; key (1,3) comprises character set {<[>(1,1), <]>(1,2), <Right Arrow>(1,3), <&>(2,1), <%>(2,2), <@>(2,3)}; key (2,1) comprises character set {</>(1,1), <*>(1,2), <->(1,3), <SPACE>(2,1), <+>(2,2), <=>(2,3)}; key (2,2) comprises character set {<^>(1,1), <CAPS>(1,2), <~>(1,3), <\>(2,1), <Down Arrow>(2,2), <|>(2,3)}; and key (2,3) comprises character set {<>(1,1), <#>(1,2), <'>(1,3), <">(2,1), <_>(2,2), <Enter>(2,3)}.

In a 12-key embodiment, the keypad array comprises up to twelve keys arranged in three columns and four rows, wherein the first six character sets are mapped to the first six keys comprising rows R1 and R2, and the second six character sets are mapped to the second six keys comprising rows R3 and R4. The character array comprises three columns and two rows providing for a character set of up to six characters on each key. Specifically, for this embodiment the first six keys and characters are mapped as follows: key (1,1) comprises character set {<A>(1,1), <B>(1,2), <C>(1,3), <D>(2,1), <E>(2,2), <F>(2,3)}; key (1,2) comprises character set {<G>(1,1), <H>(1,2), <I>(1,3), <J>(2,1), <K>(2,2), <L>(2,3)}; key (1,3) comprises character set {<M>(1,1), <N>(1,2), <O>(1,3), <P>(2,1), <Q>(2,2), <R>(2,3)}; key (2,1) comprises character set {<S>(1,1), <T>(1,2), <U>(1,3), <V>(2,1), <W>(2,2), <X>(2,3)}; key (2,2) comprises character set {<Y>(1,1), <Z>(1,2), <TAB>(1,3), <Esc>(2,1), <Help>(2,2), <Alt>(2,3)}; and key (2,3) comprises character set {<!>(1,1), <:>(1,2), <;>(1,3), <?>(2,1), <,>(2,2), <.>(2,3)}. Moreover, the second six keys and characters are mapped as follows: key (3,1) comprises character set {<HOME or Left Arrow>(3,1), <{>(3,2), <}>(3,3), <BACK>(4,1), <DELETE>(4,2), <INSERT>(4,3)}; key (3,2) comprises character set {<(>(3,1), <PgUp or Up Arrow>(3,2), <)>(3,3), <<>(4,1), <$>(4,2), <>>(4,3)}; key (3,3) comprises character set {<[>(3,1), <]>(3,2), <End or Right Arrow>(3,3), <&>(4,1), <%>(4,2), <@>(4,3)}; key (4,1) comprises character set {</>(3,1), <*>(3,2), <->(3,3), <SPACE>(4,1), <+>(4,2), <=>(4,3)}; key (4,2) comprises character set {<^>(3,1), <CAPS>(3,2), <~>(3,3), <\>(4,1), <PgDn or Down Arrow>(4,2), <|>(4,3)}; and key (4,3) comprises character set {<'>(3,1), <#>(3,2), <'>(3,3), <">(4,1), <_>(4,2), <Enter>(4,3)}. More particularly, the twelve keys can be arranged in three columns and four rows correspond to a standard phone keypad with numeric buttons and asterisk and pound buttons in their respective locations on the keypad array.

In additional embodiments, the invention further includes a momentary visual indication during the first selection of one of the plurality of keys until the second selection or matching color schemes for characters and keys having matching location coordinates. Moreover, the processor can receive a repeated character when the second selection is momentarily held. Further, arithmetic operators comprise the same character set, thereby being associated with the same key. Also, alphabetic character sets are associated with the keys arranged in the first two rows and characters other than the alphabetic character sets are associated with the keys arranged in the second two rows.

In a further embodiment, the character set displayed in association with each of the plurality of keys is located near the upper half of the key when the character set is mapped to the upper rows of the keypad and is located near the lower half of the key when the character set is mapped to the lower rows of the keypad. The invention of this embodiment further includes function keys for simultaneous selection with the selection of another key, wherein the function keys comprise one or more of <Shift>, <Control>, and <Num Lock>, and wherein the <Num Lock> function key provides access to a standard phone keypad with numeric buttons and asterisk and pound buttons in their respective locations on the keypad array rather than the input characters.

In certain embodiments of the invention, a function key provides access to the input characters when the device is part of a standard phone keypad rather than the numeric buttons and asterisk and pound buttons associated with the standard phone keypad.

In a 9-key embodiment, the keypad array includes up to nine keys arranged in three columns and three rows. The character array comprises three columns and two rows providing for a character set of up to six characters on each key. The character sets are mapped to the first six keys comprising rows R1 and R2.

In a 6-key embodiment, the keypad array comprises up to six keys arranged in three columns and two rows and wherein the character sets comprise alphabetic characters and numerical characters.

In another embodiment, the keypad array comprises up to six keys arranged in three columns and two rows forming the character array, the character array having character sets associated therewith, and additional keys arranged outside the character array.

Different embodiments of the invention address reading directions. For example, in one embodiment, the first element of the keypad array and the first element of the character array are located in accordance with conventional reading direction of the language of the character sets, and the remaining elements of the keypad array and the character array follow said reading direction. In another embodiment, the first element of the keypad array and the first element of the character array is located in the upper right corner in accordance with conventional reading direction of certain languages, and the remaining elements of the keypad array and the character array follow said reading direction.

For certain embodiments of the invention, character sets may comprise sub-sets using less than the full number of characters available on the key. The sub-sets may group characters with similar characteristics.

In an embodiment with multiple character sets, a first character set is displayed in association with each of the plurality of keys near the upper half of the key and is mapped to the upper rows of the keypad and wherein a second character set is displayed in association with each of the plurality of keys near the lower half of the key and is mapped to the lower rows of the keypad. The first and second character sets may comprise characters from different languages.

An example also includes a 12-key arrangement. The keypad array comprises up to twelve keys arranged in three columns and four rows, and the character array comprises an upper character array displayed in association with each of the plurality of keys near the upper half of the key and a lower character array displayed in association with each of the plurality of keys near the lower half of the key, each of the upper and lower character arrays comprising three columns and two rows providing for a character set of up to twelve characters on each key, wherein the first six character sets in the upper character array are mapped to the six keys comprising rows R1 and R2, and the first six character sets in the lower character array are mapped to the six keys comprising rows R3 and R4, and wherein the next six character sets in the upper character array are mapped to the six keys comprising rows R1 and R2, and the next six character sets in the lower character array are mapped to the six keys comprising rows R3 and R4. As such, the character sets can comprise characters from different languages. Moreover, the twelve keys can be arranged in three columns and four rows correspond to a standard phone keypad with numeric buttons and asterisk and pound buttons in their respective locations on the keypad array, the standard phone keypad separately accessible.

As a method, the invention can be described as two-key input method for inputting characters into a device having a keypad associated therewith, wherein input characters <CHAR> comprise alphanumeric characters and keyboard commands, and wherein the keypad comprises a plurality of keys arranged in rows R and columns C forming a keypad array, comprising: activating a first key on which is displayed a character set arranged in rows R' and columns C' displayed in association with each of the plurality of keys forming a character array to designate a character set, wherein each element in the character array, <CHAR>(R', C'), is mapped to each element in the keypad array, key(R, C), with matching location coordinates; activating a second key to designate a character within the character set by its corresponding location coordinate as mapped on the keypad array. In this method, the keypad array can comprise up to twelve keys arranged in three columns and four rows, wherein the first six character sets are mapped to the first six keys comprising rows R1 and R2, and the second six character sets are mapped to the second six keys comprising rows R3 and R4. The character array can comprise three columns and two rows providing for a character set of up to six characters on each key. The twelve keys arranged in three columns and four rows can correspond to a standard phone keypad with numeric buttons and asterisk and pound buttons in their respective locations on the keypad array, the standard phone keypad separately accessible.

As an alternate method, the invention can be described as a method of receiving characters input into a device having a keypad associated therewith, comprising: providing a device for receiving input characters from a user wherein input characters <CHAR> comprise alphanumeric characters and keyboard commands as in claim 1; receiving a selection of one of a plurality of keys on the keypad to select a character set; receiving a selection of one of a plurality of keys on the keypad to select a character within the character set.

The invention further includes a device for receiving input characters from a user wherein input characters <CHAR> comprise alphanumeric characters and keyboard commands, comprising a keypad comprising a plurality of keys arranged in rows R and columns C forming a keypad array; a character set arranged in rows R' and columns C' displayed in association with each of the plurality of keys forming a character array; means for mapping each element in the character array, <CHAR>(R', C'), to each element in the keypad array, key(R, C) with matching location coordinates for processing selection of a character; means for receiving a first selection of one of the plurality of keys on the keypad to designate a character set followed by a second selection of one of the plurality of keys on the keypad to designate a character within the character set by its corresponding location coordinate as mapped on the keypad array.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 3 shows the encoding of the English alphabet and common punctuation marks on six buttons.

FIG. 4 shows the keystroke sequences of the encoding for punctuation marks in FIG. 3.

FIG. 5 shows the encoding of arithmetic operators, page-control characters, line-control characters, and many others on six buttons.

FIG. 6 shows the keystroke sequences for the encoding in FIG. 5.

FIG. 8 shows the keystroke sequences for the encoding in FIG. 7.

FIG. 10 shows the keystroke sequences for the characters encoded in the first two rows of buttons in FIG. 9.

FIG. 11 shows the keystroke sequences for the characters encoded in the third and fourth rows of buttons in FIG. 9.

FIG. 13 shows the keystroke sequences for the characters encoded in the third and fourth rows of buttons in FIG. 12.

FIG. 15 shows the keystroke sequences for the characters encoded in the first two rows of buttons in FIG. 14.

FIG. 18 shows the keystroke sequences of the encoding in FIG. 17.

DETAIL DESCRIPTION OF THE INVENTION

Figures 1, 2:
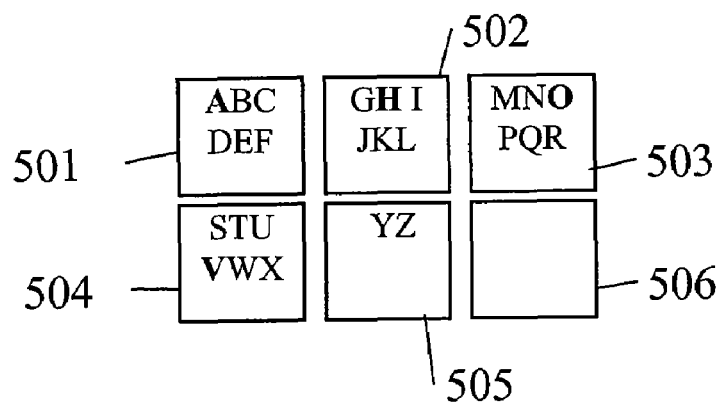
FIG. 1 shows the encoding of the English alphabet on six buttons.
FIG. 2 shows the keystroke sequences of the encoding in FIG. 1.

This invention builds on the work by Knowlton in 1976 in two aspects. First, text inputting is with a keypad of few buttons. Second, encoding a symbol is by pushing two keys and that the location of the symbol on a key indicates the keys to push. However, it further considers the language learning process of a typical person as well as the need for symbols commonly used in computing. It then arranges characters accordingly to minimize time to search for a character on a keypad.

The invention also limits a character selection to pressing two buttons, one after another. Ruling out simultaneously pressing of two buttons makes the method simple to learn and implement. Shift and control buttons are exceptions.

By encoding a character with two buttons, pressed sequentially, a keypad with few buttons can encode many different characters. The phone keypad is an example. It has twelve buttons and can encode 144 characters, which are more than the number of symbols on a typewriter keyboard. A keypad with six buttons can encode 36 characters, which are more than the number of letters in the English alphabet.

It remains, therefore, to present an encoding scheme to ease a user's transition to the system and the invention accomplishes this by a) keeping alphabetic sequence on keypad; b) keeping punctuation marks together on keypad; c) keeping remaining similar characters together on keypad; and d) strategic placement of frequently used keys. The scheme accommodates the English alphabet as well as alphabets of many other world languages and works on either real or virtual buttons.

Children learn the alphabet at an early age through their parents, with songs and in school. It is, therefore, natural to group alphabet together and keep their sequential order to ease searching during typing.

Repeating is a feature frequently found on computer keyboards, in which keeping a button pressed is the same as repeatedly typing the button. In this sequential two-key system, holding down a second button repeats a character. When the second button is the same as the first, the button can just be pressed and hold. Releasing a button from holding puts the keyboard in the state of waiting for a first button and never in the state of waiting for a second button.

As a visual aid, we may also light up the first button until a second button is pressed.

Various color schemes may aid to identify corresponding buttons.

Symbols of characters encoded with a button pressed twice may be printed bold or with a distinct color.

Symbols may be displayed near buttons instead of on buttons.

The phone keypad is, perhaps, the most commonly used one. It has four rows of three buttons easily accessible with three fingers. We refer to these buttons as 501 to 512 in this document. When we encode all twelve buttons of a phone keypad, 501 corresponds to the numeric button 1; 502 corresponds to the numeric button 2; 503 corresponds to the numeric button 3; 504 corresponds to the numeric button 4; 505 corresponds to the numeric button 5; 506 corresponds to the numeric button 6; 507 corresponds to the numeric button 7; 508 corresponds to the numeric button 8; 509 corresponds to the numeric button 9; 510 corresponds to the button with the asterisk symbol; 512 corresponds to the numeric button 0; 512 corresponds to the button with the pound symbol.

When we encode only six buttons of a phone keypad, we may place 501 to 506 on any two rows of the phone keypad as long as their respective sequence is preserved. Hence 501 may correspond to the numeric button 1; 502 to the numeric button 2; 503 to the numeric button 3; 504 to the numeric button 4; 505 to the numeric button 5; 506 to the numeric button 6. Or 501 may correspond to the numeric button 4; 502 to the numeric button 5; 503 to the numeric button 6; 504 to the numeric button 7; 505 to the numeric button 8; 506 to the numeric button 9. Or 501 may correspond to the numeric button 7; 502 to the numeric button 8; 503 to the numeric button 9; 504 to the button with the asterisk symbol; 505 to the numeric button 0; and 506 to the button with the pound symbol.

FIG. 1 shows the encoding of the English alphabet on six buttons.

Pressing two buttons sequentially encodes a character. The first button is the one on which the symbol of the character is displayed. The location of the second button relative to other buttons is the same as the location of the symbol relative to other symbols, which may include blank spaces.

As an example, in FIG. 1, the letter A is on button 501 so the first button is 501; the second button is also 501 because A is the first symbol in the first row of symbols and 501 is the first button in the first row of buttons. Another example is the letter X. It is on button 504 so 504 is the first button; the second button is 506 because X is the third symbol in the second row of symbols and 506 is the third button in the second row of buttons. Another example is the letter Z. It is on button 505 so the first button is 505; the second button is 502 because Z is the second symbol in the first row of symbols and 502 is the second button in the first row of buttons.

FIG. 2 shows the keystroke sequences of the encoding in FIG. 1.

FIG. 3 shows the encoding of the English alphabet and common punctuation marks on six buttons. We use identical encoding for the alphabet and add six common punctuation marks on 506.

FIG. 4 shows the keystroke sequences for the punctuation marks encoded in FIG. 3.

FIG. 5 shows the encoding on six buttons of arithmetic operators, page-control characters, line-control characters, and many others found on a computer keyboard. Here we assume the buttons are in the bottom two rows of a keypad and therefore display symbols in the lower half of buttons. If we move the buttons to upper rows, we should display the characters higher in the buttons.

The positions of the symbols for home, page-up, end, space, page-down, and enter characters are such that repeating a character is by pressing and holding down one button.

Characters normally come in symmetrical pairs such as parentheses and brackets are in the upper row.

Arithmetic operators have the same first button.

The symbols for backspace, delete and insert characters have the same first button.

FIG. 6 shows the keystroke sequences of the encoding in FIG. 5.

Figure 7:
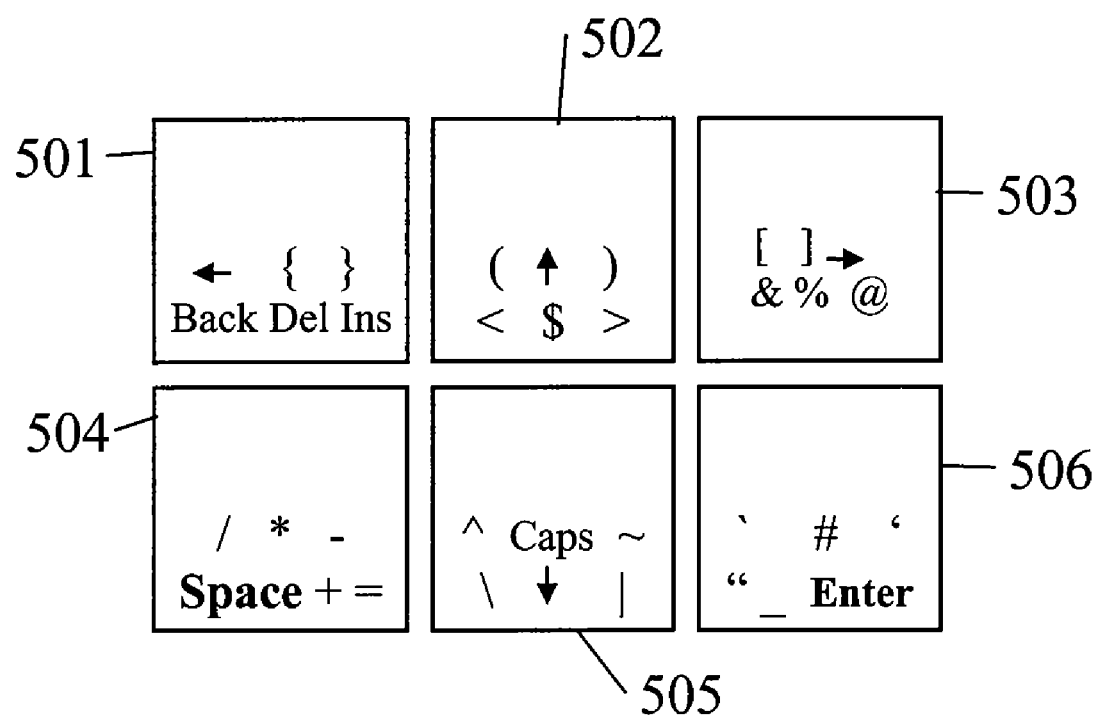
FIG. 7 shows the encoding of arithmetic operators, cursor-control characters, and many others on six buttons.

FIG. 7 shows the encoding on six buttons of arithmetic operators, cursor-control characters, and many other characters found on a computer keyboard. In this figure, the symbols for leftwards arrow, upwards arrow, rightwards arrow and downwards arrow respectively replace the symbols for home, page-up, end and page-down of FIG. 5.

FIG. 8 shows the keystroke sequences of the encoding in FIG. 7.

Figure 9:
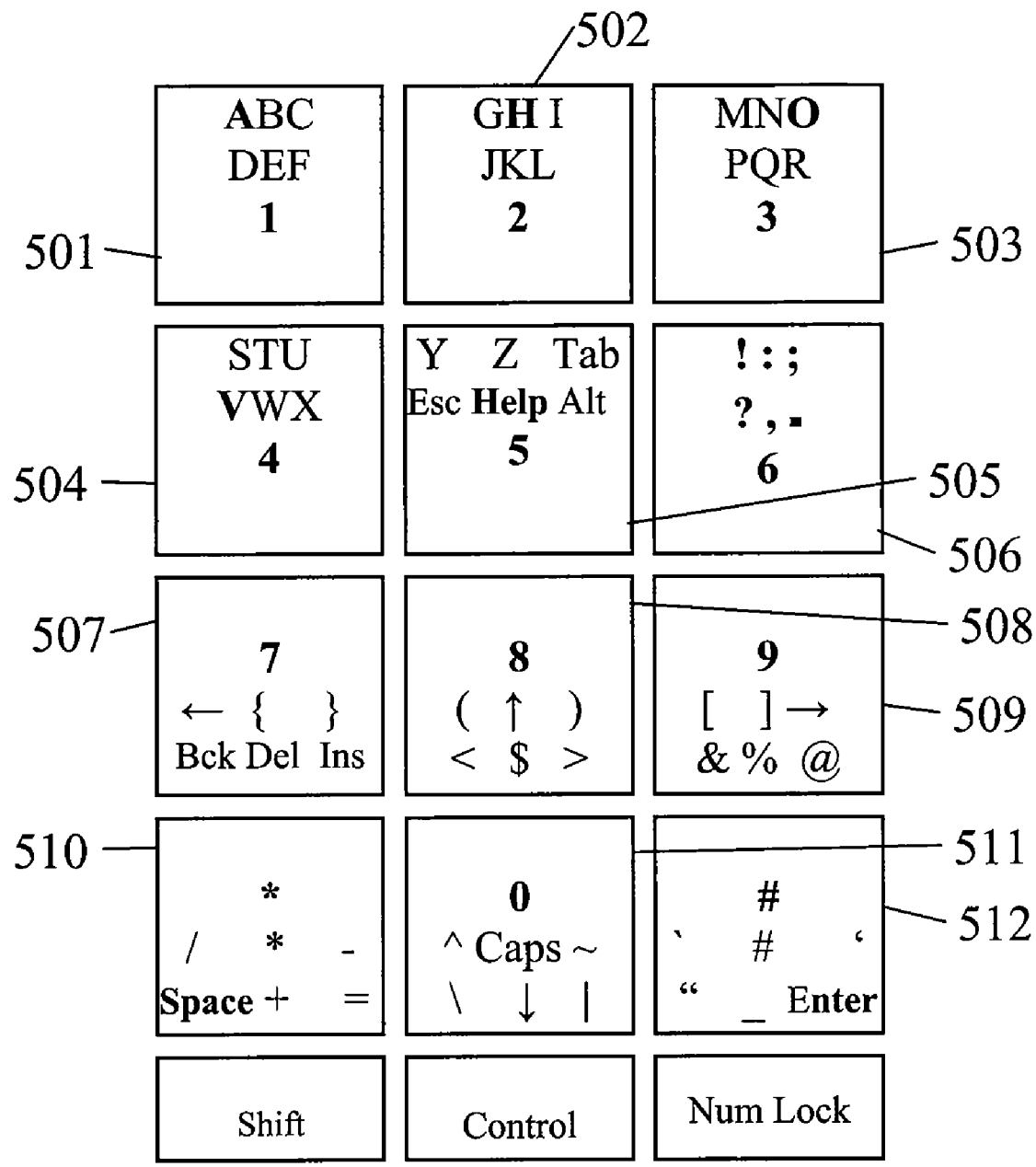
FIG. 9 shows the encoding of keyboard characters on a phone keypad.

FIG. 9 shows the encoding of the English alphabet, punctuation marks and characters frequently used in computing on the phone keypad. Here the alphabet letters and punctuation marks are on the first two rows of buttons. The other characters are on the third and fourth rows of buttons.

One frequently used button in computer applications is the help button. On the phone keypad, we display the help symbol below the letter Z to encode help with pressing 505 twice. Other useful characters to encode with 505 as the first button are the tab, the escape and the alt characters.

The phone keypad has four rows; we may display symbols higher on a button when their second buttons are on the first two rows and display them lower when their second buttons are on the last two rows.

The shift button and the control buttons, if needed, are special. They are special since we must simultaneously press one of them either with a first button, with a second button or with both.

In this figure the keypad includes a num-lock button. Pressing, sliding or turning the button locks it and deactivates the sequential two-key system. When it is un-locked, the sequential two-key system is the input method.

Instead of a num-lock button, the keypad may include a text-lock button. Pressing, sliding or turning the button locks it and sets the sequential two-key system as the input method. Unlocking it deactivates the input system.

In this figure, the shift button, the control button and the num-lock button are at the bottom but they may be placed somewhere else.

FIG. 10 and FIG. 11 show the keystroke sequences of the encoding in FIG. 9.

Figure 12:
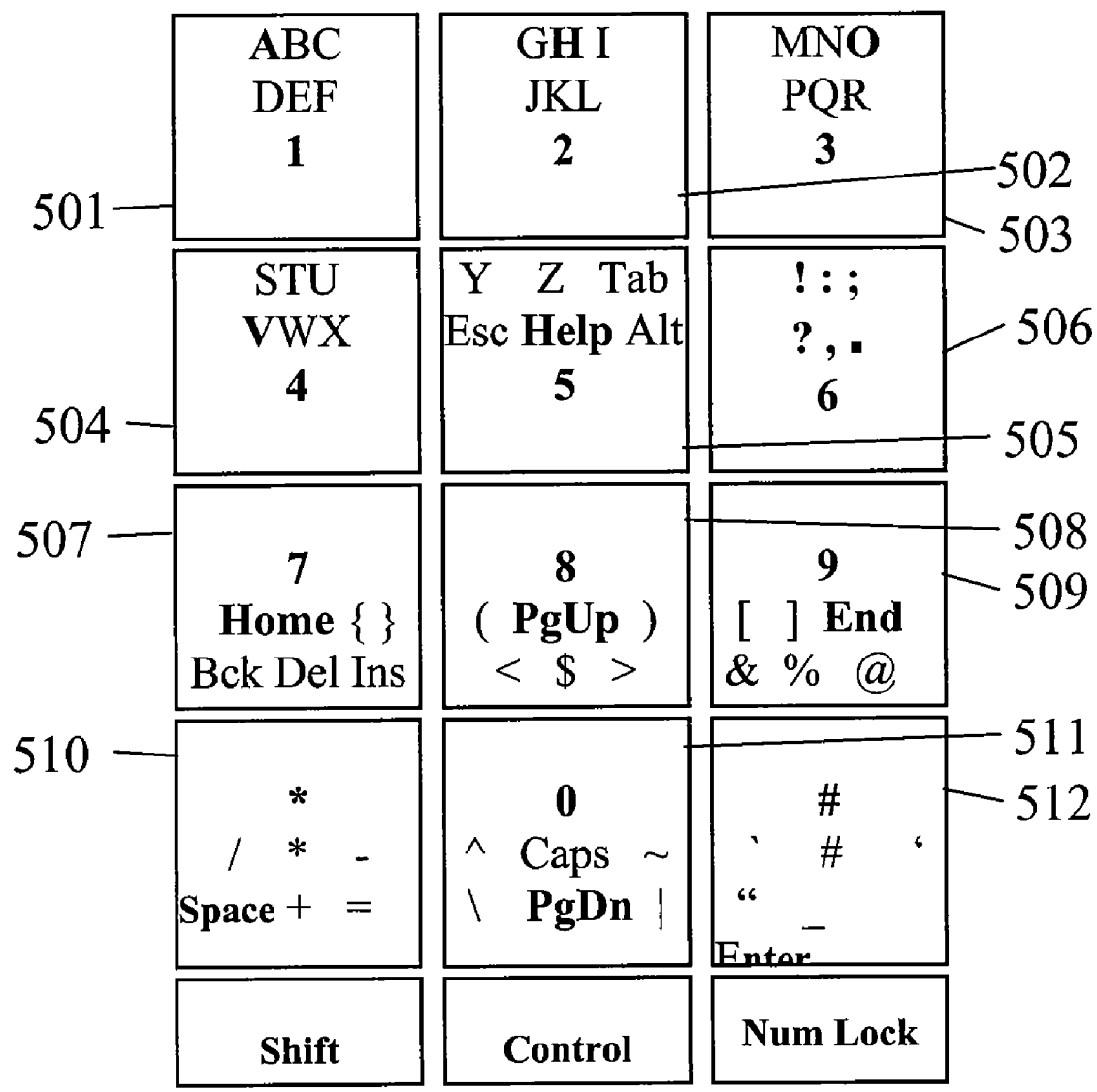
FIG. 12 shows another encoding variation of keyboard characters on a phone keypad.

FIG. 12 shows the alternate encoding of characters frequently used in computing on the phone keypad. The differences between this figure and FIG. 9 are replacements of cursor-control characters with those for page-control and line-control: the home symbol replaces the leftwards arrow symbol; the page-up symbol replaces the upwards arrow symbol; the end symbol replaces the rightwards arrow symbol; the page-down symbol replaces the downwards arrow symbol.

FIG. 13 shows the keystroke sequences for the characters encoded in the third and fourth rows of buttons in FIG. 12.

While the phone keypad is perhaps the most popular keypad, there are other applications with smaller keypads.

Figure 14:
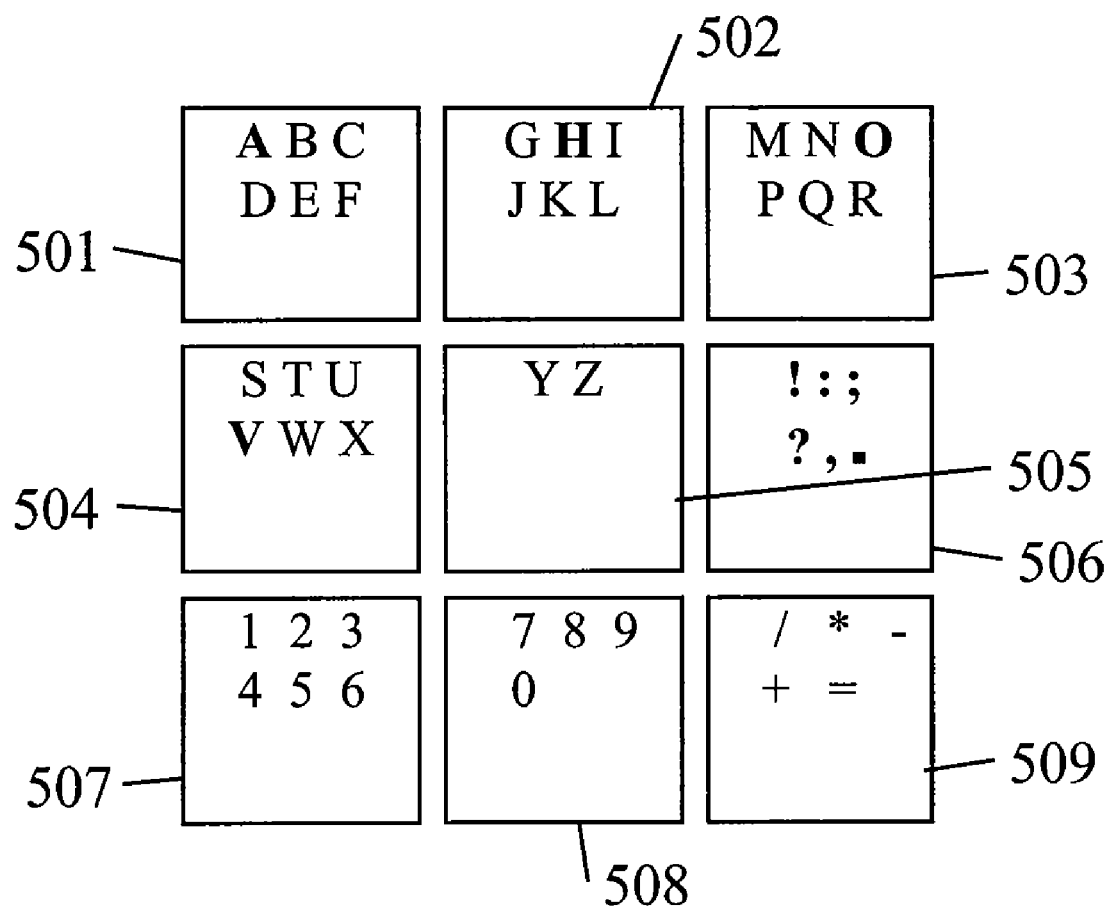
FIG. 14 shows the encoding of the English alphabet, common punctuation marks, arithmetic operators and numbers on nine buttons.

A keypad with nine buttons can support 81 characters using the sequential two-key system. FIG. 14 shows the encoding of the English alphabet, punctuation marks, arithmetic operators and numbers on a keypad with nine buttons.

Figures 16, 17:
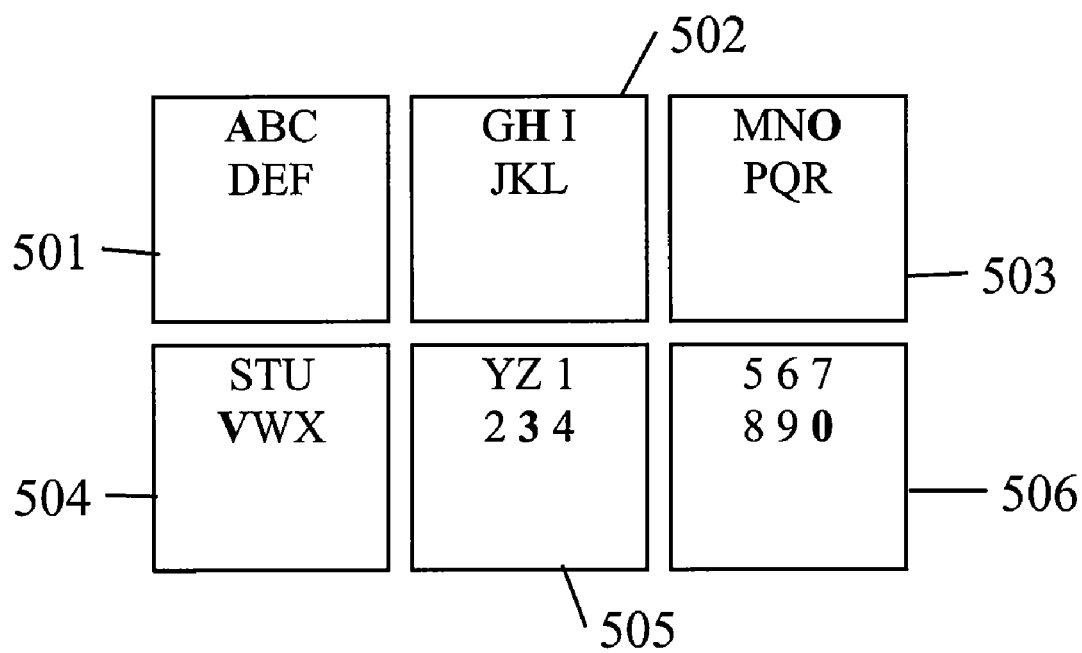
FIG. 16 shows the keystroke sequences for the characters encoded in the third row of buttons in FIG. 14.
FIG. 17 shows the encoding of the English alphabet and numbers on six buttons.

FIG. 15 and FIG. 16 show the keystroke sequences of the encoding in FIG. 14.

Portable music players have about six buttons. The invention proposes an encoding for the alphabet and numbers on six buttons. FIG. 17 shows the encoding and FIG. 18 shows the keystroke sequences.

Figure 19:
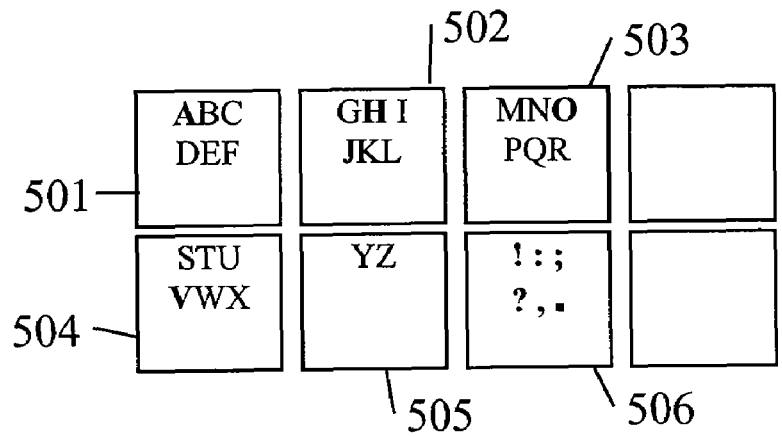
FIG. 19 shows the English alphabet with punctuation marks on eight buttons.
Figure 20:
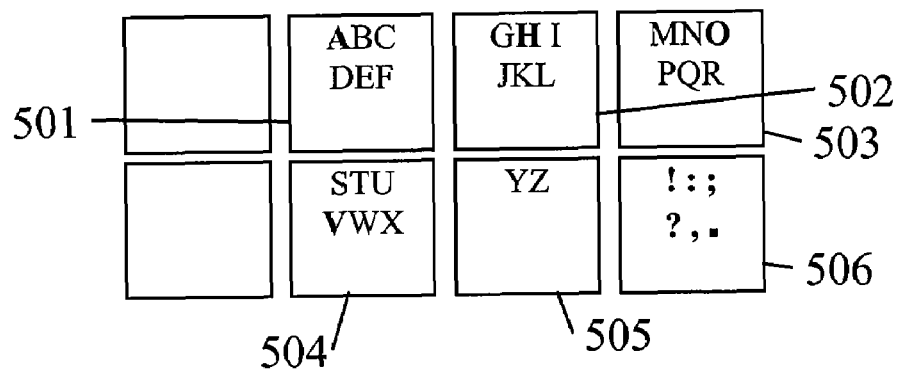
FIG. 20 shows another variation of the English alphabet with punctuation marks on eight buttons.

For keypads with rows of four buttons or more, keeping the encoding proposed in this invention will ease transition between devices. Since a row of three buttons is a subset of a row with more than three buttons, keeping the encoding of rows with three buttons is always possible by ignoring buttons outside of the subset. FIG. 19 and FIG. 20 show two different ways the keypad in FIG. 3 may be extended to a keypad with rows of four buttons and keep keystroke sequences unchanged.

A telephone keypad can encode 144 characters and each button can display four rows of three characters.

The first two rows of buttons can encode the English alphabet, punctuation marks and symbols of a few common characters. The last two rows of buttons can encode numbers, arithmetic operators and other symbols commonly found in computing. Still, seventy-two locations are vacant.

Other alphabets may occupy the vacant locations or replace symbols at occupied locations. However, we should note the conventions for reading directions of a language before presenting its alphabet on the keypad. While reading in English is from left to right and then from top to bottom, other languages may not follow the same convention. For examples, Arabic and Hebrew reading are from right to left and then from top to bottom and Chinese reading is from top to bottom and then from left to right.

Following are the rules to display letters of an alphabet on a keypad: a) Selection of a button to display the first letter of an alphabet should follow the convention for reading directions of the language. b) Selection of a location on a button to display the first letter on a button should follow the convention for reading directions of the language. c) Selection of a location to display the next alphabetic letter on a button should follow the convention for reading directions of the language. d) Selection of a next button to display the next alphabetic letter should follow the convention for reading directions of the language.

Figure 21:
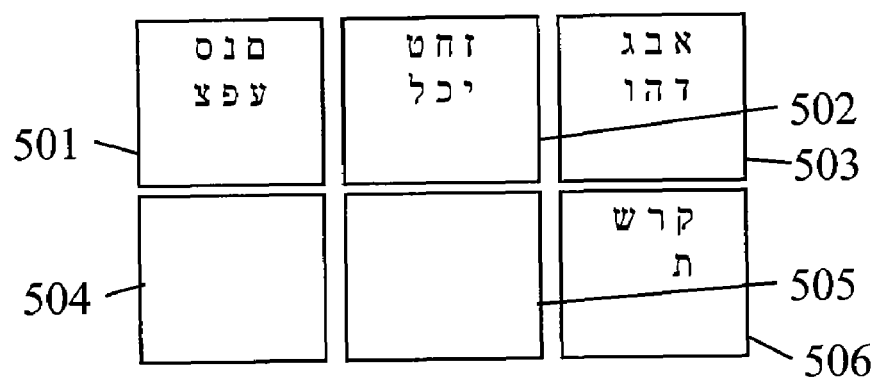
FIG. 21 shows the Hebrew alphabet on six buttons.

FIG. 21 is an encoding example of a language where the convention for reading directions is different from that in English. As reading of Hebrew text is from right to left then from top to bottom, aleph (א), the first letter of the alphabet is on the third button of the first row. The arrangement of letters on a button also follow the right to left then top to bottom usage, hence the letter beth (ב) is on the left of the letter aleph. To follow the right to left convention, zayin (ז), the seventh letter of the alphabet, is on the second button of the first row of buttons. Other letters are similarly arranged.

Figures 22, 23:
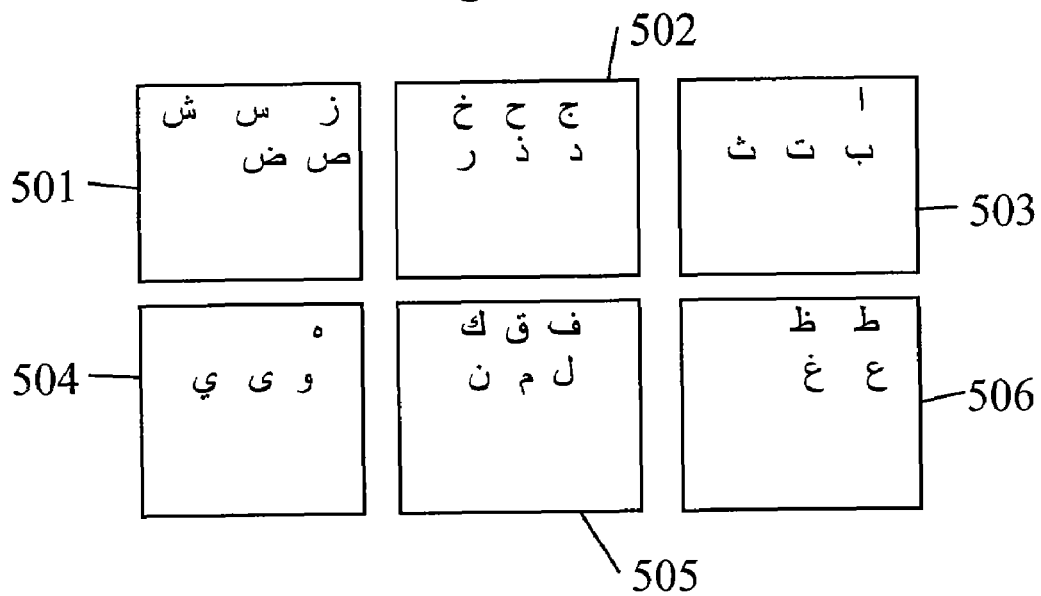
FIG. 22 shows the encoding of the Hebrew alphabets on six buttons.
FIG. 23 shows the Arabic alphabet on six buttons.

FIG. 22 shows the keystroke sequences of the Hebrew alphabet encoded in FIG. 21.

Some languages may group its alphabet letters into subgroups while maintaining the alphabetic order. We may space symbols with one or more blank spaces to indicate such grouping.

FIG. 23 is an example where inserting blank-spaces help to group Arabic letters with similar shapes. On the third button of the first row, two blank spaces are displayed after the letter alef (ا) so that the letters beh (ب) ), teh (ت) and theh (ث) are together. Similar insertions are on other buttons.

Figure 24:
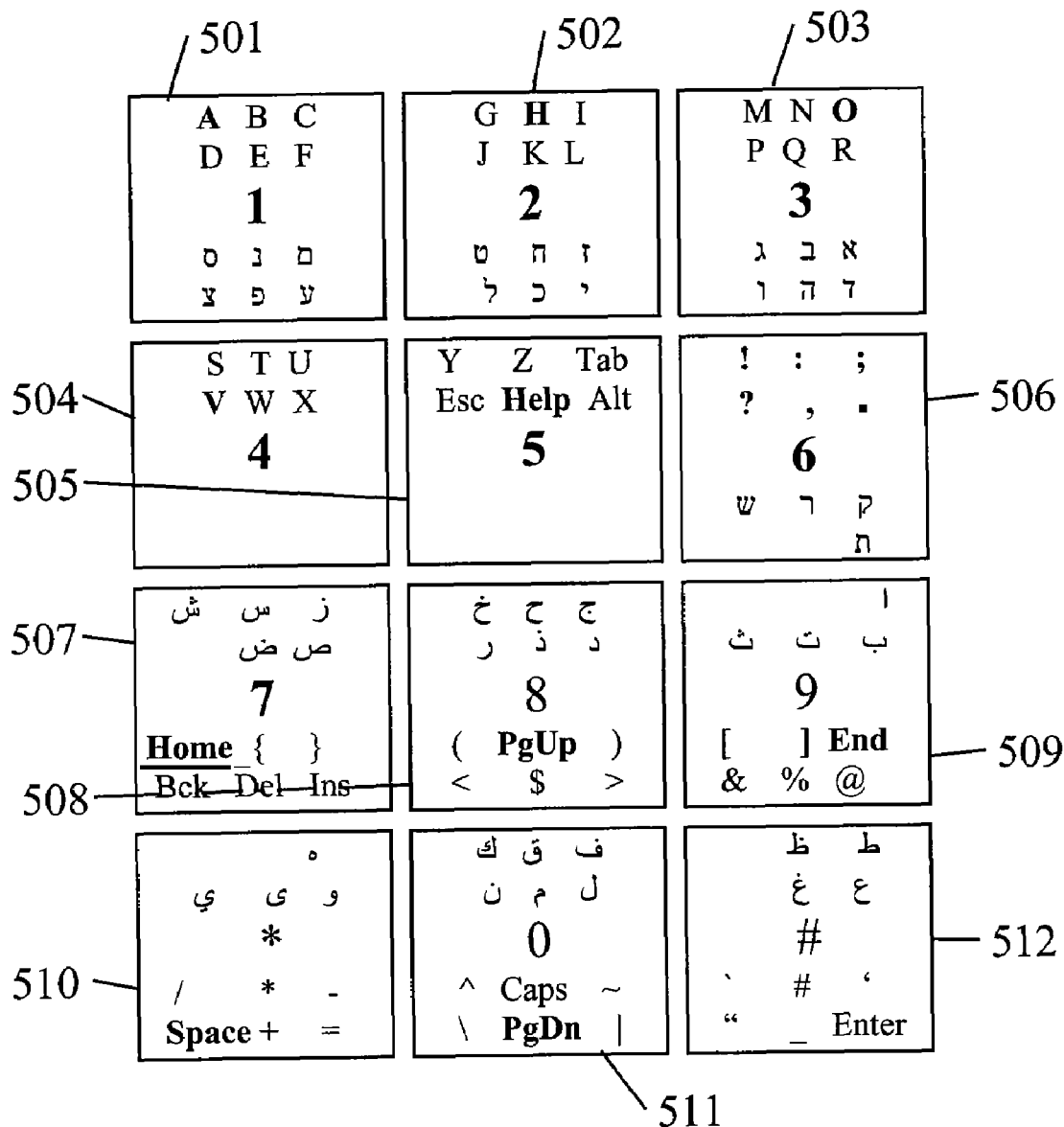
FIG. 24 shows the English, Hebrew and Arabic alphabets, punctuation marks, arithmetic operators and many computing symbols on a keypad with 12 buttons.

FIG. 24 is an example where the phone keypad can encode alphabets of three languages. Here the English, Hebrew and Arabic alphabets, punctuation marks, arithmetic operators and many computing symbols are on the phone keypad with 12 buttons. As the Hebrew alphabet is below the English alphabet in the first two rows, encoding of a Hebrew letter is first with a button in the top two rows and then with a second button in the bottom two rows. As the Arabic alphabet is above computing symbols in the bottom two rows, encoding of an Arabic letter is first with a button in the bottom two rows and then with a second button in the top two rows.

We may place a non-English alphabet on rows above the rows for the English alphabet instead of below the rows for the English alphabet. This alters symbol relative locations. It also changes the second button in keystroke sequence as the location of a symbol, relative to others on the same button, indicates the location of the second button.

We may also place the symbols encoded in FIG. 5 below the two rows for the English alphabet and punctuation marks. This alters the keystroke sequences: the first buttons to encode the symbols encoded in FIG. 5 that were in the third row of buttons, are now on the first row of buttons; and the first buttons to encode the symbols encoded in FIG. 5 that were in the fourth row of buttons, are now on the second row of buttons.

Most alphabets of European languages share many of the same characters in the English alphabet and may also have symbols that are not available in the English alphabet. These extra symbols may be added into, before or after the symbols displayed on buttons in accordance with the teachings of this invention.

EXAMPLES

The following examples describe certain embodiments of the invention and are not to be construed as limiting.

In one example, the invention may be described as follows: A device to input characters to an electronic component, comprising: providing a keypad that includes four rows of buttons, in which each row consists of three buttons, wherein: the letters A, B and C are respectively displayed on the first button of the first row; the letters D, E and F are respectively displayed below the letters A, B and C; the letters G, H and I are respectively displayed on the second button of the first row; the letters J, K and L are respectively displayed below the letters G, H and I; the letters M, N and O are respectively displayed on the third button of the first row; the letters P, Q and R are respectively displayed below the letters M, N and O; the letters S, T and U are respectively displayed on the first button of the second row; the letters V, W and X are respectively displayed below the letters S, T and U; the letters Y and Z are respectively displayed on the second button of the second row; the tab symbol is displayed on the right of the letter Z; the symbols for escape, help and alt are respectively displayed below the symbols for Y, Z and tab; the exclamation mark (!), colon (:) and semi-colon (;) are respectively displayed on the third button of the second row; the question mark (?), colon (,) and period (.) are respectively displayed below the exclamation mark, colon and semi-colon; the home, left brace ({) and right brace (}) symbols are respectively displayed on the first button of the third row; the backspace, delete and insert symbols are respectively displayed below the home, the left brace and the right brace symbols; the left parenthesis, page-up, and right parenthesis symbols are respectively displayed on the second button of the third row; the symbols for less-than (<), dollar sign ($), and greater-than (>) are respectively displayed below the symbols for left parenthesis, page up, and right parenthesis; the symbols for left square bracket ([), right square bracket (]) and end are respectively displayed on the third button of the third row; the symbols for ampersand (&), percent (%) and at (@) are respectively displayed below the symbols for left square bracket, right square bracket and end; the symbols for slash (/), asterisk (*) and minus (−) are respectively displayed on the first button of the fourth row; the symbols for space, plus (+) and equal (=) are respectively displayed below the symbols for slash, asterisk and minus; the circumflex (^), capital lock, and tilde (~) symbols are respectively displayed on the second button of the fourth row; the symbols for back slash (\), page-down and vertical bar (|) are respectively displayed below the circumflex, the cap-lock, and the tilde symbols; the symbols for grave accent (), pound (#) and single quote (') are respectively displayed on the third button of the fourth row; the symbols for double quote ("), low line (_) and enter are respectively displayed below the symbols for grave accent, pound and single quote.

In another example, the respective symbols for home, page-up, end and page-down may be replaced by the symbols for leftwards arrow, upwards arrow, rightwards arrow and downwards arrow.

In still a further example, the invention may be described as a device to input characters to an electronic component, comprising: providing a keypad that includes three rows of buttons, in which each row consists of three buttons, wherein: the letters A, B and C are respectively displayed on the first button of the first row; the letters D, E and F are respectively displayed below the letters A, B and C; the letters G, H and I are respectively displayed on the second button of the first row; the letters J, K and L are respectively displayed below the letters G, H and I; the letters M, N and O are respectively displayed on the third button of the first row; the letters P, Q and R are respectively displayed below the letters M, N and O; the letters S, T and U are respectively displayed on the first button of the second row; the letters V, W and X are respectively displayed below the letters S, T and U; the letters Y and Z are respectively displayed on the second button of the second row; the numbers 1, 2 and 3 are respectively displayed on the first button of the third row; the numbers 4, 5 and 6 are respectively displayed below the numbers 1, 2 and 3; the number 7, 8 and 9 are respectively displayed on the second button of the third row; the numbers 0 is displayed below the letter 7; the symbols for slash (/), asterisk (*) and minus (−) are respectively displayed on the third button of the third row; and the symbols for plus (+) and equal (=) are respectively displayed below the symbols for slash and asterisk.

In a further example, the invention may be described as a device to input characters to an electronic component, comprising: providing a keypad that includes a first and a second row of buttons, in that order, in which each row consists of three buttons, wherein: the letters A, B and C are respectively displayed on the first button of the first row; the letters D, E and F are respectively displayed below the letters A, B and C; the letters G, H and I are respectively displayed on the second button of the first row; the letters J, K and L are respectively displayed below the letters G, H and I; the letters M, N and O are respectively displayed on the third button of the first row; the letters P, Q and R are respectively displayed below the letters M, N and O; the letters S, T and U are respectively displayed on the first button of the second row; the letters V, W and X are respectively displayed below the letters S, T and U; the letters Y and Z are respectively displayed on the second button of the second row; the number 1 is displayed on the right of the letter Z; the numbers 2, 3 and 4 are respectively displayed below the letters Y, Z and the number 1; the numbers 5, 6 and 7 are respectively displayed on the third button of the second row; and the numbers 8, 9 and 0 are respectively displayed below the numbers 5, 6 and 7.

Additionally, the embodiments of the invention may also include adding a shift button, wherein capitalizing is by simultaneously holding the shift button with the first button, or by simultaneously holding the shift button with the second button, or by simultaneously holding the shift button with the first button and then with the second button; adding a control button, wherein a control character is composed by simultaneously holding the control button with the first button, or by simultaneously holding the control button with the second button, or by simultaneously holding the control button with the first button and then with the second button; adding a num-lock button, wherein locking the button deactivates the sequential two-key system, and un-locking the button activates the sequential two-key system.

An example of the invention also provides for a method of repeatedly inputting a character to an electronic component using the device described in these examples, comprising: holding the first button down when it is the same as the second button; and holding the second button down when it is different than the first button.

Additionally, the embodiments of the invention may also include displaying alphabet letters of a non-English language above or bellow said symbols.

While there has been shown and described what is considered to be a preferred embodiment of the invention, it will, of course, be understood that various modifications and changes in form or detail could readily be made without departing from the spirit of the invention. It is therefore, intended that the invention not be limited to the exact form and detail herein shown and described, nor to anything less than the whole of the invention herein disclosed.

The invention claimed is:

1. A device for receiving input characters, comprising
a keypad comprising a plurality of keys arranged as a numeric phone keypad, wherein each key has a surface thereon for displaying indicia, said plurality of keys arranged in rows and columns, wherein the keypad is divided into an upper section of at least two rows forming a first keypad array and a lower section of at least two rows forming a second keypad array;
indicia located on the surface of said plurality of keys comprising a first plurality of characters arranged as a plurality of character arrays on the first keypad array representing a first language and a second plurality of characters arranged as a plurality of character arrays on the second keypad array representing a second language; such that when the character array is located in the upper section, it comprises characters mapped by relative location to the first keypad array, and when the character array is located on the lower section, it comprises characters mapped by relative location to the second keypad array; and
a processor for receiving sequential two-key input of a first selection of one of the plurality of keys to designate a selected character array followed by a second selection of one of the plurality of keys to designate a selected character within the character array.

2. The device of claim 1 wherein the character array is located near the upper half of the key when the character array is mapped to the first keypad array and is located near the lower half of the key when the character array is mapped to the second keypad array.

3. A device for receiving input characters of at least two and up to four different languages on a keypad using a sequential two-key entry method, comprising
a keypad comprising a plurality of keys arranged as a numeric phone keypad wherein each key has a surface thereon for displaying indicia, said plurality of keys arranged in rows and columns, wherein the keypad is divided into an upper section of at least two rows forming a first keypad array and a lower section of at least two rows forming a second keypad array;
wherein the first keypad array comprises indicia located on the surface of said plurality of keys comprising a fist plurality of characters arranged as a first plurality of character arrays on an upper portion of the surface representing a first language and a second plurality of characters arranged as a second plurality of character arrays on a lower portion of the surface representing a second language; and
wherein the second keypad array comprises indicia located on the surface of said plurality of keys comprising a third plurality of characters arranged as a third plurality of character arrays on an upper portion of the surface representing a third language and a forth plurality of characters arranged as a forth plurality of character arrays on a lower portion of the surface representing a forth language;
wherein the first and second plurality of character arrays comprise-characters mapped by relative location to the first keypad array and wherein the third and forth character arrays comprise-characters mapped by relative location to the second keypad array; and
a processor for receiving sequential two-key input of a first selection of one of the plurality of keys to designate a selected character array followed by a second selection of one of the plurality of keys to designate a selected character within the character array.

4. The device of claim 3 wherein the keypad comprises at least twelve keys arranged as three columns and four rows.

5. The device of claim 3 wherein the keypad comprises at least twelve keys arranged as three columns and four rows, further comprising additional keys not part of the first or second keypad array for providing additional commands and functions.

6. The device of claim 4 wherein the twelve keys arranged in three columns and four rows correspond to a standard phone keypad with numeric buttons and asterisk and pound buttons in their respective locations on the keypad.

7. The device of claim 3 further comprising a momentary visual indication during the first selection until the second selection.

8. The device of claim 3 further comprising matching color schemes for characters and keys having matching location coordinates.

9. The device of claim 3 wherein the processor receives a repeated character when the second selection is momentarily held.

10. The device of claim 3 wherein arithmetic operators are grouped in the same character array set, thereby being associated with the same key.

11. The device of claim 3 further comprising function keys for simultaneous selection with the selection of another key.

12. The device of claim 11 wherein the function keys comprise one or more of <Shift> , <Control>, and <Num Lock>.

13. The device of claim 12 wherein the <Num Lock> function key provides access to a standard phone keypad with numeric buttons and asterisk and pound buttons in their respective locations on the keypad rather than the input character.

14. The device of claim 3 wherein a function key provides access to the input character when the device is part of a standard phone keypad rather than the numeric buttons and asterisk and pound buttons associated with the standard phone keypad.

15. The device of claim 3 wherein the first element of the keypad array and the first element of the character array are located in accordance with conventional reading direction of the language.

16. The device of claim 15 wherein the first element of the keypad array and the first element of the character array is located in the upper right corner in accordance with conventional reading direction of certain languages.

17. The device of claim 3 wherein character arrays may comprise partial arrays utilizing less than the full number of elements available in the array.

18. The device of claim 17 wherein partial arrays group characters with similar characteristics.

19. The device of claim 3 wherein the first, second, third, and forth plurality of character arrays comprise characters from different languages.

20. The device of claim 3 wherein elements of the character arrays are arranged on the keys in accordance with the conventional reading direction of the language.

21. The device of claim 20, wherein languages with left-to-right reading direction are arranged left-to-right on the keys and languages with right-to-left reading direction are arranged right-to-left on the keys.

22. The device of claim 3 wherein one of said plurality of character arrays comprises English language characters, up to two of said plurality of character arrays comprise language characters different from the English language, and one of said plurality of character arrays comprises non-alphanumeric characters and function commands.

23. The device of claim 22 wherein the English language character set further includes non-alphanumeric characters and function commands.

24. The device of claim 3 wherein said plurality of character arrays comprise up to three sets of alphanumeric characters of different languages and one set of non-alphanumeric characters and function commands.

25. A device for receiving input characters of at least two different languages on a keypad using a sequential two-key entry method, comprising:
 a keypad comprising a plurality of keys arranged as a numeric phone keypad forming a keypad array having rows and columns, wherein each key has a surface thereon for displaying indicia;
 indicia located on the surface of said plurality of keys comprising a first plurality of characters arranged as a plurality of character arrays on an upper portion of the surface representing a first language and a second plurality of characters arranged as a plurality of character arrays on a lower portion of the surface representing a second language; wherein the character arrays are mapped by relative location to the keypad array; and
 a processor for receiving sequential two-key input of a first selection of one of the plurality of keys to designate a selected character array followed by a second selection of one of the plurality of keys to designate a selected character within the character array.

26. The device of claim 25 wherein the first element of the keypad array and the first element of the character array are located in accordance with conventional reading direction of the language.

27. The device of claim 25 further comprising a momentary visual indication during the first selection until the second selection.

28. The device of claim 25 wherein the processor receives a repeated character when the second selection is momentarily held.

29. The device of claim 25 wherein the keypad comprises at least twelve keys arranged as three columns and four rows.

30. The device of claim 1 wherein the first element of the keypad array and the first element of the character array are located in accordance with conventional reading direction of the language.

31. The device of claim 1 further comprising a momentary visual indication during the first selection until the second selection.

32. The device of claim 1 wherein the processor receives a repeated character when the second selection is momentarily held.

* * * * *